Jan. 29, 1924.  
A. J. BORST, JR  
1,482,113  
TRACTION AND DRIVING MECHANISM FOR VEHICLES  
Filed Nov. 20, 1917   3 Sheets-Sheet 1

Witness:  
E. M. Schweiger

Andrew J. Borst, Jr., Inventor.  
By Emil Neuhart  
Attorney.

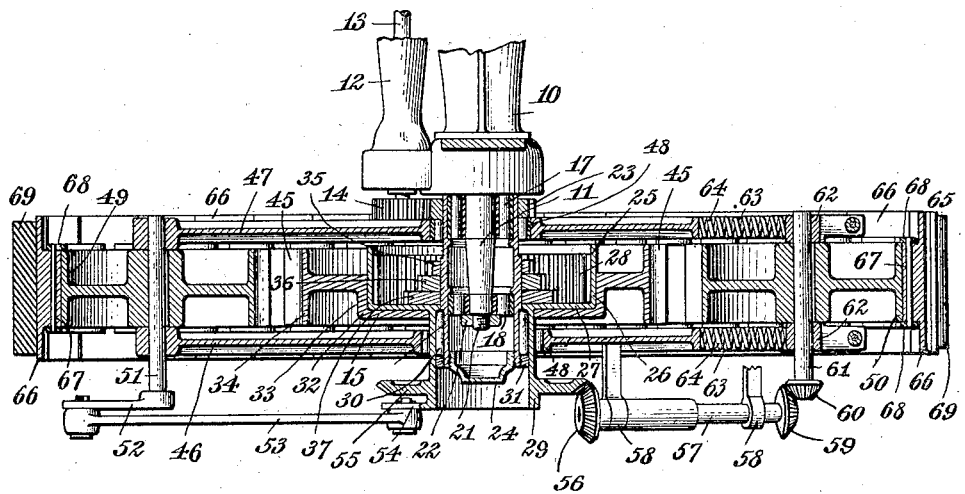

Jan. 29, 1924.

A. J. BORST, JR 1,482,113

TRACTION AND DRIVING MECHANISM FOR VEHICLES

Filed Nov. 20, 1917    3 Sheets-Sheet 3

Patented Jan. 29, 1924.

1,482,113

UNITED STATES PATENT OFFICE.

ANDREW J. BORST, JR., OF BUFFALO, NEW YORK.

TRACTION AND DRIVING MECHANISM FOR VEHICLES.

Application filed November 20, 1917. Serial No. 202,918.

*To all whom it may concern:*

Be it known that I, ANDREW J. BORST, Jr., a citizen of the United States, residing at Buffalo, in the county of Erie and State of New York, have invented certain new and useful Improvements in Traction and Driving Mechanism for Vehicles, of which the following is a specification.

My invention relates to improvements in traction and driving mechanisms for vehicles, and more particularly to a vehicle designed for hauling heavy loads and traveling over rough or irregular surfaces.

One of the objects of my invention is the provision of a novel combined drive and traction mechanism including a traction belt, the whole being adapted to be mounted on an axle, rotatable or non-rotatable, to take the place of the usual traction or driving wheel.

Another object of my invention is the provision of improved driving mechanism whereby increased power is obtained over the present form of driving mechanisms now in use.

Another object is the provision of a driving mechanism embodying a driving wheel provided with a plurality of gears with which a similar number of driving pinions are adapted to mesh for rotating the wheel at the desired speed.

Further objects are to provide an improved traction belt and improved driving mechanism which is efficient and economical and operable on wet or muddy ground or roads fully as well as when traveling over dry roads. The invention has other advantages, some of which will be more fully set forth in the following description.

The invention consists in a driving or traction member, including a traction belt, adapted to be applied to an axle or spindle of a vehicle to take the place of the usual driving or traction wheel.

The invention also consists in the novel driving mechanism and in the novel features of construction and combination and arrangement of parts to be hereinafter described and more particularly pointed out in the subjoined claims.

In the drawings,—

Fig. 3 is a longitudinal section taken on line *a—a*, Fig. 1, the means for driving the sprocket wheels being, however, shown in plan view.

Fig. 4 is an enlarged vertical section taken on line *b—b*, Fig. 1.

Referring now to the drawings in detail, like numerals of reference refer to like parts in the several figures.

Figure 1:
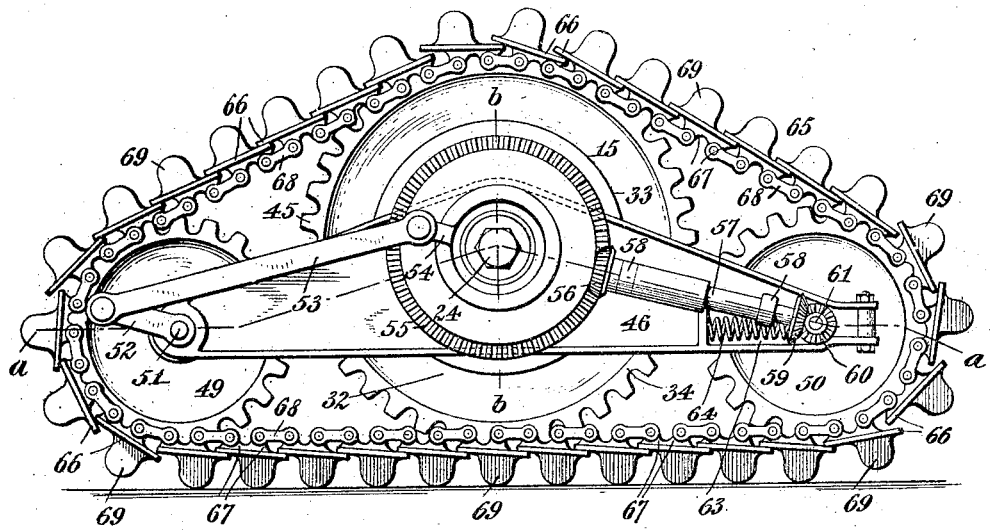
Fig. 1 is a side elevation of a traction member constructed according to my invention in what I now consider the preferred form.
Figure 2:
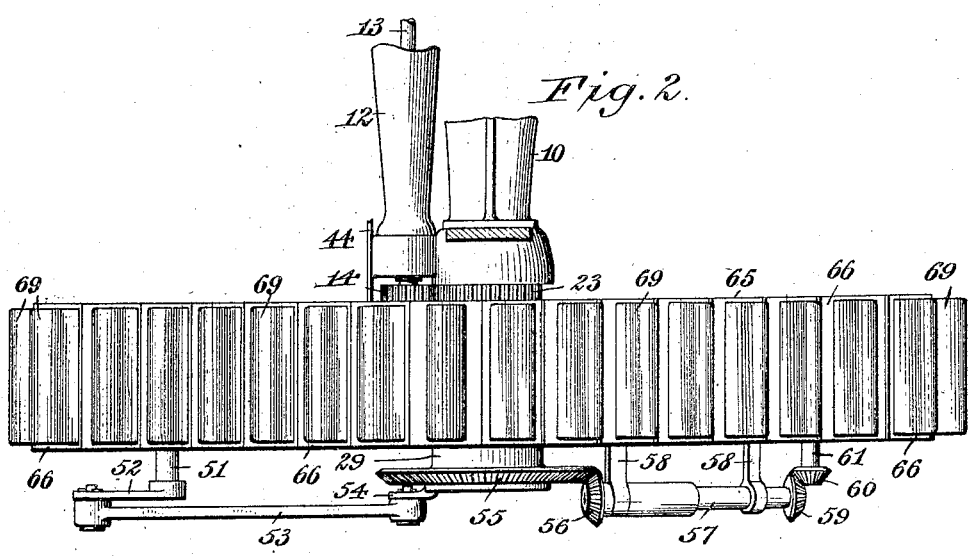
Fig. 2 is a plan view of the same showing part of the rear casing, including a part of the drive shaft.
Figure 5:
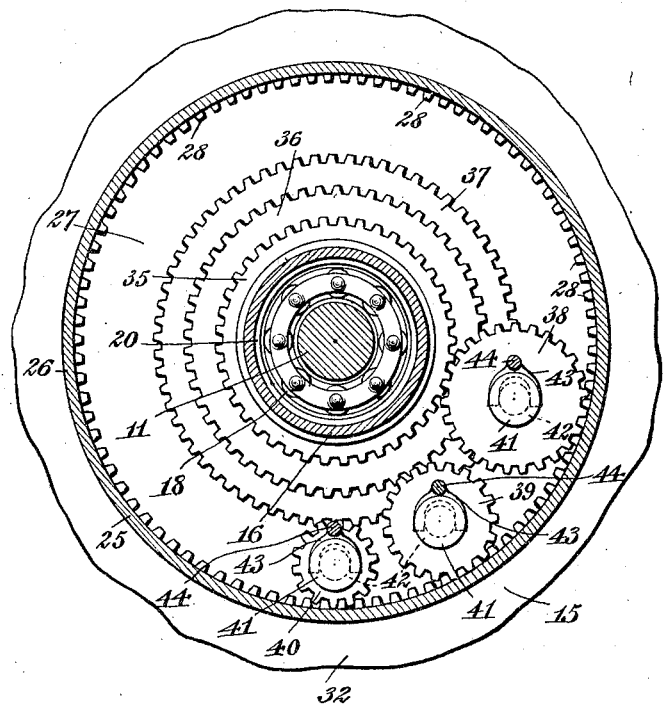
Fig. 5 is a vertical transverse section taken on line *c—c*, Fig. 4, looking in the direction of the arrow crossing said line, the parts being arranged for different speed than shown in Fig. 4.

In the drawings I have shown a single traction member and the driving mechanism for the same, such as is applied to each side of a vehicle, and in the preferred construction illustrated in Figs. 1 to 6, 10 designates the axle of a truck or other power-driven vehicle, this axle being constructed in any approved manner and provided with a non-rotatable spindle 11. In a housing 12 carried by the axle 10 a driving axle 13 is mounted, said axle being operated by a motor in the usual manner and to the outer end thereof a driving pinion 14 is secured.

15 designates a two-part driving wheel which is mounted on the spindle 11. A hollow inner hub 16 forms one part of said driving wheel and between the cylindrical wall of said hub and the spindle 11 roller bearings 17, 18 are interposed; the inner bearing 17 having its outer end in contact with an internal stop bead 19 formed on the wheel hub 16 and the outer bearing having its inner end in contact with a similar stop bead 20. The outer end of the spindle 11 is reduced in diameter and threaded, as at 21, and a nut 22 is applied to said threaded end and bears against the outer roller bearing, thus retaining said hub properly upon said spindle.

Keyed or otherwise secured to the wheel hub 16 is a gear wheel 23 with which the driving pinion 14 meshes and thus causes rotation of said driving wheel. The outer end of the wheel hub 16 is closed with a hub cap 24.

Fitting onto the hub 16 of the wheel and forming part of said wheel is an internal gear 25 which is of dish-shape and comprises a rim 26 and a web 27, said rim being provided with internal teeth 28. Extending outwardly from the web of said internal gear is a hub 29 of somewhat larger diameter than the hub 16, and between the two a roller bearing 30 is interposed, also a retainer nut 31 which is threaded onto the outer end of the hub portion 16 and has its outer peripheral face in contact with the inner peripheral face of the hub portion 29. Fastened to said internal gear is the web portion 32 of the driving wheel which is offset, as at 33, to position the rim 34 of said wheel in proper relation to the roller bearings 17, 18 and 30 so that the load of the vehicle is distributed over said bearings. The internal gear 25 with its hub 29 and the web portion 32 and rim 34 constitute the other part of said driving-wheel 15.

Keyed or otherwise fastened to the hub 16 of the wheel are a plurality of driving gears, the combined width of which may equal or be somewhat less than the width of the gear teeth on said internal gear.

In the drawings I have shown a low speed driving-gear 35, an intermediate speed driving-gear 36, and a high speed driving-gear 37, but any other number of gears may be employed, depending on the number of changes desired in the speed to be imparted to the driving wheel. Retained in meshing relation with the internal gear 25 are three idler gears 38, 39, 40 of different diameters, said idler gears while retained in meshing relation with said internal gear being also arranged for slidable movement so that the idler gear 38 may be brought into mesh with the low speed driving-gear 35; so that the idler 39 may be brought into mesh with the intermediate driving-gear 36, and so that the idler 40 may be brought into mesh with the high speed driving-gear 37. For this purpose each of the idler gears 38, 39 and 40 is provided with extensions 41, each of which has an annular groove 42 into which a forked arm 43 is adapted to enter, said forked arm being formed at one end of an operating rod 44 which may be connected to suitable mechanism reaching to a point within convenient reach of the driver's or chauffeur's seat. This operating mechanism may be constructed in any approved manner permitting any one of the idler gears to be moved into mesh with its corresponding driving gear while the remaining idler gears are moved or retained out of mesh with their corresponding driving gears, or all of the idler gears may be moved out of mesh with their corresponding driving gears. As any one of various forms of operating mechanisms may be employed for the purpose of actuating the rod 44, and I do not consider this as forming any part of my invention, such mechanisms have been omitted from the drawings.

The driving wheel is provided with peripheral teeth 45, for a purpose to appear hereinafter, and at opposite sides of said driving wheel supporting frames 46, 47 are arranged; each of said frames having a central opening 48 through one of which the hub 16 is passed, and through the other of which the hub 29 extends with the outer end of hub 16 extending thereinto. These frames extend in opposite directions from the axis of the driving wheel 15 and are adapted to support sprocket wheels 49, 50 at opposite ends thereof. The sprocket wheel 49 is secured to a shaft 51 journaled in corresponding ends of the two supporting frames, and to one end of said shaft an arm 52 is secured, the outer end of which has pivotal connection with one end of a connecting rod 53. The opposite end of said connecting rod is pivotally secured to an arm 54 extending from the hub 29. Said hub is provided at its outer end with a bevel gear 55 which has meshing therewith a bevel pinion 56 secured to a shaft 57 journaled in suitable supporting arms 58 extending outwardly from the outer supporting frame 46. The shaft 57 is extensible and has at its outer end a bevel gear 59 which is in mesh with a bevel gear 60 secured to a shaft 61 journaled in bearings 62 adjustable in the opposite ends of said supporting frames, said shaft 61 having the sprocket wheel 50 secured thereto.

The last-mentioned ends of the supporting frames 46, 47 are provided with elongated openings 63 in which coil springs 64 are placed, one end of each of said springs bearing against the inner end wall of the opening 63 in which it is located and the other end bearing against the adjustable bearing 62 in which the shaft 61 is located.

65 designates my improved traction belt or member which is adapted to pass over the sprocket wheels 49, 50, and over the teeth 45 of the driving wheel. This traction belt comprises a series of plates 66 so arranged that each plate overlaps an adjoining plate at one end and is overlapped by the adjoining plate at its other end. Each plate 66 has two inwardly projecting spaced ears 67, and connecting the ears of adjoining plates are sprocket links 68. The links 68 and plates 66 therefore co-operate to serve as a sprocket chain into which the teeth of the driving wheel 15 and those of the sprocket wheels 49, 50 enter, the plates 66 serving to permit the attachment thereto of rubber traction blocks 69. These blocks are vulcanized or otherwise fastened to the outer faces of said plates in a manner to assure good traction and maximum gripping effect.

From the foregoing description it will be apparent that the driving axle 13 causes rotation of the inner hub 16 by reason of the driving pinion or primary drive member 14 on said axle being in mesh with the gear wheel 23 on said hub, and when said hub is rotated, the several driving gears employed within the driving wheel 15 for changing the speed of the latter, are caused to rotate with said hub portion. When the idler gears 38, 39 and 40 are out of mesh with their respective driving gears, the inner hub 16 will rotate without imparting such action to the outer hub 29, or other parts of the driving or traction member surrounding said outer hub, this being due to the fact that the outer hub 29 is rotatable upon the inner hub and by reason of the roller bearing 30 being interposed between the two hubs 16 and 29 the inner hub 16 may rotate freely within the outer hub. When, however, one of the idler gears is moved into mesh with its co-operating driving gear, the outer hub 29 is caused to rotate with the inner hub 16, either at the same speed, at a diminished speed, or at an increased speed, depending upon the ratio of the driving gears, idler gears and the internal gear with which the idler gears are at all times in mesh, such ratio of course being changed, depending upon the demands of the vehicle to which the driving and traction member may be applied.

When, for instance, the idler gear 38 is brought into mesh with the low speed driving-gear 35, the outer hub 29 will be rotated at a reduced speed; that is to say, the rotation of the outer hub 29 will be slower than that of the inner hub 16. When, however, the idler gear 39 is brought into mesh with the intermediate speed driving-gear 36, the rotation of the outer hub 29 will or may be the same as that of the inner hub 16, and when the idler gear 40 is brought into mesh with the high speed driving-gear 37, the speed of the outer hub 29 will be greater than that of the inner hub 16. This particular arrangement, however, need not be adhered to, as any desired ratio of speed may be embodied in the construction, or all of the gears employed between the inner and outer hub portions may be reducing gears, all of which will be understood by those skilled in the art to which this invention appertains, in view of the explanation above made.

By reason of the outer hub 29 being formed integral with the internal gear and the web portion 32 of the driving wheel 15 being secured to said internal gear, said driving wheel will, of course, be governed in speed according to the ratio of the driving gears, idler gears and internal gear, and it is to be understood that when the speed of the driving wheel is reduced from that of the inner hub 16, or "bearing sleeve" as it may be termed, the traction power is increased in proportion. The rotation of the driving wheel 15 causes the traction belt to travel in contact with the road surface, and as this traction belt passes over and underneath said driving wheel and around opposite sprocket wheels 49, 50, the peripheral edges of the teeth of which are in the same horizontal plane at their lowest points, a straight stretch of the belt is presented to the surface over which the device is to move. By means of the arm 52 and its connecting rod 53, and by means of the bevel gears 55, 60, and the extensible shaft 57, the two sprocket wheels 49, 50 are caused to rotate and carry the traction belt around the same in timed relation with the movement of the driving wheel 15. In this manner a considerable stretch of the traction belt is presented to the road surface, which stretch extends both forwardly and backwardly from the driving wheel and therefore at all times provides a self-laying track on which the driving wheel is rotated; it being of course understood that suitable mechanism is provided for reversing the inner hub 16 of said driving wheel, and consequently the entire driving wheel, so that the traction belt serves as a self-laying track, both for forward and rearward travel of the vehicle.

It is also to be noted that by reason of each of the plates 66 of the traction belt being overlapped by an adjoining plate at one end and overlapping a plate at the other end, it guards against the forced entrance of mud between these plates and into the links and, moreover, when these plates pass around the sprocket idlers at opposite ends of the device, any mud retained between the traction blocks 69 extending outwardly from said plates is released due to these blocks becoming spaced apart to a greater extent on the curve around said sprocket idlers than when traveling in a straight line, as clearly shown in Fig. 1.

By removing the hub cap 24 and the nut 22, the entire device may be removed from the spindle 11 of the axle and the ordinary rear driving wheel substituted for said device.

The construction above described is one particularly adapted for a vehicle in which the wheel spindle is non-rotatable and is to be provided with a driving pinion, sprocket, or the like, to which motion is imparted from a driving element suitably supported on the vehicle.

It will be apparent that various modifications may be resorted to in the construction of a driving traction device constructed under the principle involved without departing from the spirit of my invention or sacrificing any of the advantages thereof.

Having thus described my invention, what I claim is,—

1. The combination of a vehicle axle, and a traction member on said axle comprising a pair of spaced supporting frames, an inner hub on said axle journaled in one of said frames, a series of driving gears of different diameters secured to said hub, a traction driving wheel having an internal gear, and a series of idler gears in mesh with said internal gear and each adapted to be moved into or out of mesh with one of said driving gears.

2. The combination with a vehicle axle and a primary driving mechanism, of a traction member comprising a hub rotatable on said axle and adapted to be driven by said primary driving mechanism, a plurality of gear wheels of different diameters secured to said hub, a driving traction wheel having an internal gear, and a plurality of idler gears in mesh with said internal gear and each adapted to be moved into or out of mesh with one of said driving gears.

3. The combination of a vehicle axle, a hub rotatable on said axle, a gear wheel secured to said hub, a driving shaft, a driving pinion on said shaft in mesh with said gear wheel, a driving traction wheel rotatable with said hub, and including means to permit said wheel to rotate at the same or at a changed speed with reference to said hub, and means for supporting said hub and said driving traction wheel.

4. The combination of a non-rotatable vehicle axle, a hub rotatable on said axle, means for rotating said hub, a driving traction wheel rotatable with said hub and including means to permit said wheel to rotate at the same or at a changed speed with respect to said hub and also to permit said hub to rotate independently of said driving traction wheel, means supporting one end of said hub, and means supporting said driving traction wheel and through the latter the other end of said hub.

5. The combination of a non-rotatable vehicle axle, an inner hub rotatable on said axle, means for rotating said inner hub, a traction driving wheel surrounding said inner hub and having an outer hub, and mechanism interposed between said inner hub and said driving traction wheel whereby the latter may be driven from said inner hub at different speeds.

6. The combination of a non-rotatable vehicle axle, a hub surrounding said axle, anti-friction bearings between said hub and axle, a gear wheel secured to said hub, primary driving mechanism including a driving pinion in mesh with said gear wheel, a driving traction wheel rotatable on said hub and having a bevel gear thereon, and change-speed mechanism between said hub and said driving traction wheel.

7. The combination of a non-rotatable vehicle axle, a pair of spaced supporting frames, a hub surrounding said axle, anti-friction bearings between said hub and said axle, a driving gear secured to the inner end of said hub, means for rotating said driving gear, a driving traction wheel rotatable with said hub, and means to permit said hub to rotate independently of said driving traction wheel, a roller bearing in one of said supporting frames for supporting the inner end of said hub, and a roller bearing in the other supporting frame for supporting said driving traction wheel and through the medium of the latter supporting the outer end of said hub.

In testimony whereof I affix my signature.

ANDREW J. BORST, JR.